United States Patent
Zhao et al.

(10) Patent No.: US 12,079,050 B2
(45) Date of Patent: Sep. 3, 2024

(54) DYNAMICALLY SWITCHING DISPLAY IN USE BASED ON TEMPERATURE

(71) Applicant: Microsoft Technology Licensing, LLC, Redmond, WA (US)

(72) Inventors: Zenghui Zhao, Bellevue, WA (US); Chau Van Ho, Des Moines, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/754,695

(22) PCT Filed: Sep. 17, 2020

(86) PCT No.: PCT/US2020/051218
§ 371 (c)(1),
(2) Date: Apr. 8, 2022

(87) PCT Pub. No.: WO2021/076262
PCT Pub. Date: Apr. 22, 2021

(65) Prior Publication Data
US 2024/0094788 A1     Mar. 21, 2024

(30) Foreign Application Priority Data
Oct. 15, 2019    (NL) .................................... 2024020

(51) Int. Cl.
*G06F 1/20*    (2006.01)
*G06F 1/16*    (2006.01)
(Continued)

(52) U.S. Cl.
CPC ............. *G06F 1/206* (2013.01); *G06F 1/1647* (2013.01); *G06F 1/3265* (2013.01); *G06F 3/1431* (2013.01)

(58) Field of Classification Search
CPC ...... G06F 1/1647; G06F 1/206; G06F 1/3265; G06F 3/1423; G06F 3/1431; G09G 2330/021; Y02D 10/00
(Continued)

(56) References Cited

U.S. PATENT DOCUMENTS 6,317,110 B1    11/2001    Brandt
6,727,824 B1    4/2004    Miseli et al.
(Continued)

FOREIGN PATENT DOCUMENTS

| CN | 109951581 A | 6/2019 |
|---|---|---|
| EP | 0959452 A2 | 11/1999 |
| WO | 2013073256 A1 | 5/2013 |

OTHER PUBLICATIONS

Anand, et al., "Adaptive Display Power Management for Mobile Games", In Proceedings of the 9th International Conference on Mobile Systems, Applications, and Services, Jun. 28, 2011, pp. 57-70.
(Continued)

*Primary Examiner* — Chun Cao
(74) *Attorney, Agent, or Firm* — Alleman Hall & Tuttle LLP

(57) ABSTRACT

A device comprising a display and a display controller. The display comprises a first display portion and a second display portion. The display controller is configured to assess a temperature condition of a surface of the first display portion; and responsive to the temperature condition, to initiate a switching of display content from one of the display portions to the other display portion.

20 Claims, 5 Drawing Sheets

(51) Int. Cl.
*G06F 1/3234* (2019.01)
*G06F 3/14* (2006.01)

(58) Field of Classification Search
USPC .......................................................... 700/300
See application file for complete search history.

(56) References Cited

U.S. PATENT DOCUMENTS

| | | | |
|---|---|---|---|
| 7,245,272 | B2 | 7/2007 | Shiuan et al. |
| 8,972,759 | B2 | 3/2015 | Doshi et al. |
| 9,600,055 | B2 | 3/2017 | Kp |
| 9,727,134 | B2 | 8/2017 | Aurongzeb et al. |
| 2006/0262474 | A1 | 11/2006 | Chen et al. |
| 2011/0301777 | A1 | 12/2011 | Cox et al. |
| 2012/0176353 | A1* | 7/2012 | Ishii .................. G09G 5/10 345/1.3 |
| 2013/0080799 | A1* | 3/2013 | Artman .................. G06F 1/206 713/300 |
| 2014/0325432 | A1* | 10/2014 | Frederickson .......... G06F 9/451 715/788 |
| 2016/0048363 | A1 | 2/2016 | North et al. |
| 2016/0266628 | A1 | 9/2016 | Jain et al. |
| 2019/0189042 | A1* | 6/2019 | Aurongzeb ........... G06F 1/1681 |
| 2019/0371225 | A1* | 12/2019 | Aurongzeb ........... G06F 3/1423 |

OTHER PUBLICATIONS

"Search Report and Written Opinion Issued in Netherland Patent Application No. N2024020", Mailed Date: Jun. 18, 2020, 9 Pages.
"International Search Report and Written Opinion Issued in PCT Application No. PCT/US20/051218", Mailed Date: Dec. 17, 2020, 10 Pages.
Office Action Received for Chinese Application No. 202080072805.0, mailed on Nov. 16, 2023, 10 pages (English Translation Provided).

* cited by examiner

DYNAMICALLY SWITCHING DISPLAY IN USE BASED ON TEMPERATURE

CROSS REFERENCE TO RELATED APPLICATIONS

The present application is a U.S. National Phase of International Patent Application Serial No. PCT/US2020/051218 entitled "DYNAMICALLY SWITCHING DISPLAY IN USE BASED ON TEMPERATURE", filed Sep. 17, 2020, which claims priority to Netherlands Patent Application Serial No. 2024020, filed Oct. 15, 2019, the entire contents of each of which are hereby incorporated by reference for all purposes.

BACKGROUND

Computer systems may be configured for interaction with users via touch screen display devices. However, when a touch screen display devices is operated for an extended duration, the touch screen display device may become hot to the touch.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A device comprises a display and a display controller. The display comprises a first display portion and a second display portion. The display controller is configured to assess a temperature condition of a surface of the first display portion, and responsive to the temperature condition, to initiate a switching of display content from one of the display portions to the other display portion.

DETAILED DESCRIPTION

Computing devices may support interaction with users via interactive visual content presented via one or more displays. As a non-limiting example, the displays may include liquid crystal displays, light emitting diode displays, or displays based on any other suitable technology. As a further non-limiting example, the one or more displays may include touch display module (TDM) devices configured to visually present content, and also further configured to receive touch input, for example input including touch events with coordinates corresponding to the visually presented content. As a non-limiting example, TDM devices may include capacitive sensors configured to detect one or more contacts with human finger(s), capacitive stylus device(s), etc., based on a capacitance change resulting from contact/proximity. As another non-limiting example, TDM devices may include pressure sensors configured to detect contact based on pressure or deformation due to touch contact. More generally, interactive visual content may be used to convey information to users, irrespective of whether input devices (e.g., such as TDM devices) are employed.

Devices configured for display and/or touch input may be referred to more generally herein as touch input/output (I/O) devices. Touch I/O devices may be based on any suitable technologies, e.g., TDM devices as described above. In some examples, a computing device may include a plurality of different display and/or input devices, for example, a plurality of different touch I/O devices, each configured to independently display content and/or receive inputs.

Figure 1A:
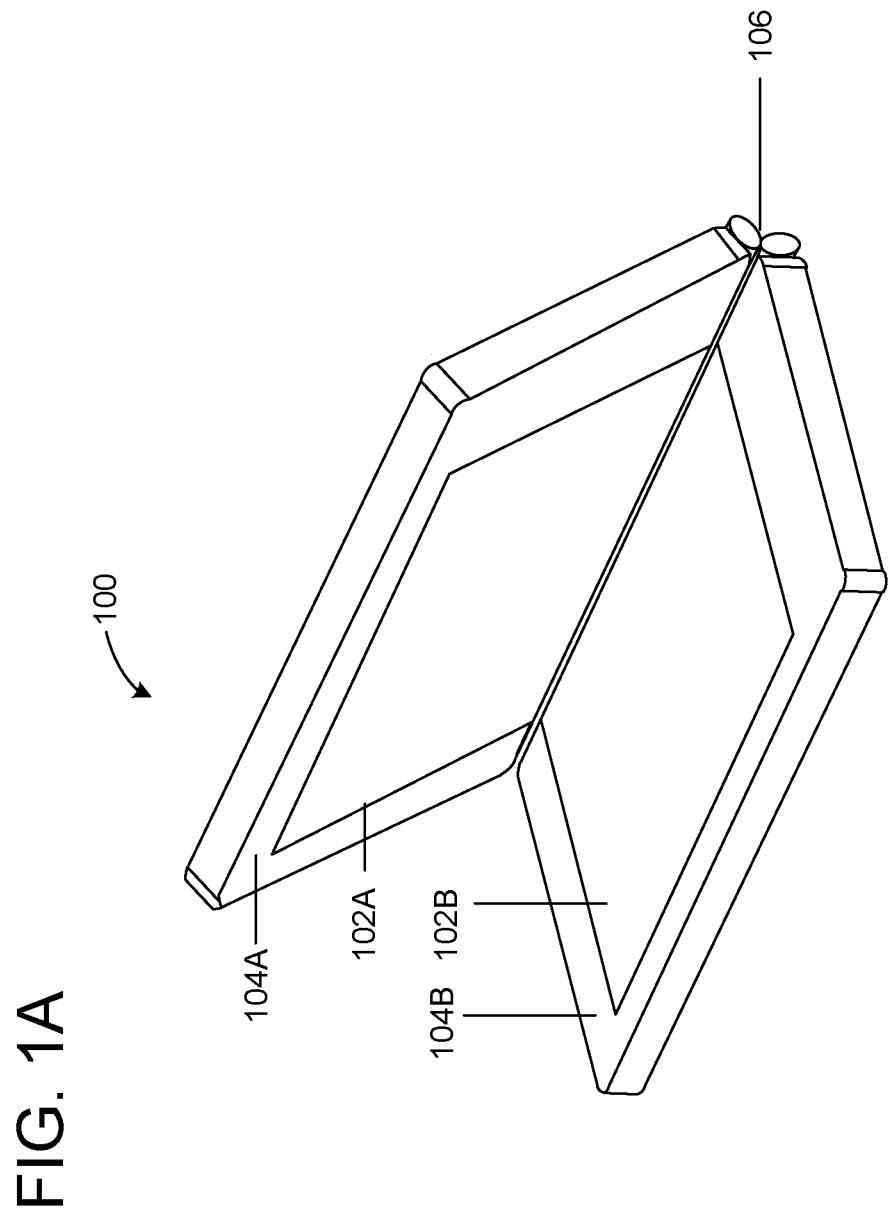
FIG. 1A shows an exemplary computing device including two touch screen displays.

FIG. 1A—Illustration of Computing Device

FIG. 1A shows an exemplary computing device 100 including two different touch I/O devices, namely touch I/O device 102A and touch I/O device 102B. As shown in FIG. 1A, the touch I/O device 102A is in a separate housing 104A from touch I/O device 102B which has its own housing 104B. Computing device 100 is depicted without any particular scale, but as a non-limiting example computing device 100 may be a mobile device designed to be held in a human user's hands, e.g., the longest dimension of computing device 100 may be approximately 6 inches. Accordingly, computing device 100 may be powered in any suitable manner, for example, by including one or more batteries configured to power computing device 100 during mobile use. Computing device 100 is one non-limiting example, and the techniques of the present disclosure may be applicable for computing devices of various other sizes and/or form factors.

As depicted, housing 104A and housing 104B are connected by a hinge 106. For example, computing device 100 shown in FIG. 1A may be folded along hinge 106. Although computing device 100 is shown folded at an acute angle (e.g., an angle between 45 and 90 degrees) with regard to the I/O device surfaces, hinge 106 may permit folding of device 100 into a variety of different angles. For example, device 100 may be folded, e.g., so as to cause the touch I/O device 102A and touch I/O device 102B to lie flush against each other (e.g., at an angle of fewer than 5 degrees). As another example, device 100 may be unfolded to an approximately 180 degree angle, e.g., so as to cause the touch I/O device 102A and touch I/O device 102B to lie parallel and in-plane. In some examples, device 100 may be unfolded to an angle greater than 180 degrees.

In some examples, such as shown in FIG. 1A, touch I/O devices are included an enclosure designed to be held, touched, and/or otherwise interacted with by a human user. In some examples, a touch I/O device may be included in a device housing, for example installed behind cover glass. For example, although not shown specifically in FIG. 1A, cover glass may be integrated into housing 104A to cover touch I/O device 102A, and similarly cover glass may be integrated into housing 104B to cover touch I/O device 102B. The cover glass may be configured in any suitable manner to permit detection of touch events by the TDM. As a non-limiting example of interaction with a human user, the human user may hold the device housing (e.g., including touching the cover glass) while viewing content, while providing input with a TDM or other input device (e.g., by touching the cover glass, or while waiting for a computational task to be completed by the computing device.

In some examples, a computing device may include further components associated with a display (e.g., associated with a TDM). For example, the computing device may include one or more graphical processing units (GPU) configured to perform computations related to visually presenting content. As another example, the computing device may include one or more back light units (BLU) configured to provide illumination of the visual content. In some examples, GPU and/or BLU components may be physically located in the same enclosure with the display device. For example, a BLU may be physically located behind and/or within a display device (e.g., as a layer in a stack of optical and/or sensor components of a TDM device). As another example, computing device 100 may include one or more GPU devices. When included, one of the GPU devices may be physically located in a housing of computing device 100, for example in housing 104A or in housing 104B. When computing device 100 includes more than one GPU device, the GPU devices may be distributed across housings of computing device 100 in any suitable manner, for example, housing 104A may include one GPU device while housing 104B includes a second GPU device. As an example, the GPU devices may be arranged so as to correspond to touch I/O devices managed by each GPU device, e.g., so that a first GPU corresponding to touch I/O device 102A is included in housing 104A and a second GPU corresponding to touch I/O device 102B is included in housing 104B.

Touch I/O devices and/or related components may accumulate heat during prolonged operation. For example, heat may be accumulated due to associated BLU and/or GPU devices, and/or electrical circuitry associated with powering the touch I/O device and/or carrying electromagnetic signals related to visual content. As such, touch I/O devices may become substantially warmer when used for an extended duration, and/or as more power is expended for short periods of time (e.g., due to bright light emitted by BLU, computationally expensive rendering by GPU, and/or high frequency and/or power of electromagnetic signals used to carry visual content, for example due to high rendering resolution). Furthermore, when a computing device includes two or more touch I/O display devices, overall power consumption and/or overall heat accumulation may be increased (e.g., relative to a comparable computing device that has only one touch I/O device). Furthermore, with two or more touch I/O devices, due to the increased power consumption, peak performance may be reduced. Due to increased power consumption, battery life of a mobile device (e.g., computing device 100) may be reduced by operating the two displays (relative to operating just one display).

If a touch I/O device and/or surrounding enclosure becomes noticeably warm to the touch when touched by a human user, the human user may be distracted, experience discomfort, become concerned about damage/malfunction, or otherwise be displeased. For example, if temperatures are above a safe temperature threshold for an extended duration, human users may experience harm such as skin irritation or burns. Even if temperatures are not high enough to cause harm to a human user, human users may prefer not to interact with a display that is noticeably warm. For example, human users may perceive that a computing device is performing poorly if the computing device becomes warm to the touch during use (e.g., even if the computing device is in fact performing acceptably).

Accordingly, computing device 100 is configured to detect when a touch I/O device may become too warm, and dynamically switch visual presentation of content between the two different touch I/O devices, to avoid allowing either touch I/O device to become too warm. In some examples, computing device 100 may be configured with regard to a maximum safe temperature, e.g., a pre-defined standard temperature that is believed to be safe for extended operation without causing discomfort and/or harm to human users who may be touching the computing device during the extended operation. As a non-limiting example, a maximum safe temperature may be defined as 48 degrees Celsius. In some examples, the maximum safe temperature may be safe for at least brief touch interaction by human users, e.g., so that burns or other harm are acceptably unlikely to occur when a human user interacts with a computing device at the maximum safe temperature. In some examples, the maximum safe temperature may be chosen based on empirical observation of user comfort (e.g., based on user reporting). In some examples, a maximum safe temperature may be a standard temperature established by a standards organization. In some examples, computing device 100 may be configured with regard to a user-defined temperature preference. For example, a user may prefer that the touch I/O devices not exceed 45 degrees Celsius.

Accordingly, computing device 100 is configured to detect when either touch I/O device becomes hot. As a non-limiting example, display device 100 may include a first temperature sensor associated with touch I/O device 102A and/or within housing 104A, and a second temperature sensor associated with touch I/O device 102B and/or within housing 104B. If one of the touch I/O devices does become warm enough that it may be noticeable, cause discomfort, and/or cause harm, computing device 100 is configured to dynamically switch displaying content from that touch I/O device to a different touch I/O device (e.g., to switch from displaying content at touch I/O device 102A to instead display the same content at touch I/O device 102B). Computing device 100 may be configured to dynamically switch visual content at any suitable threshold temperature, for example an empirically-determined safe temperature threshold (e.g., a maximum safe temperature), a user-defined temperature threshold, or any other suitable temperature. Accordingly, computing device 100 may mitigate the accumulation of heat at either touch I/O device, thereby allowing the touch I/O devices to remain within a comfortable operating temperature. A methodology for dynamically switching visual content is described further below with regard to FIG. 1B and method 200 of FIG. 2.'

In addition to avoiding user discomfort due to high temperatures, dynamically switching displays may permit operating one or both displays at higher performance. For example, performance may be improved due to increased efficiency of display hardware at cooler temperatures. Alternately or additionally, performance may be improved due to greater ability to allocate more power to a cooler touch I/O device and operate the cooler touch I/O device for a longer period of time before the increased power allocation causes accumulation of too much heat (e.g., as compared to allocating the same amount of power to a hotter touch I/O device that would quickly accumulate too much heat).

Although FIG. 1A depicts a computing device 100 including two separate displays in separate housings, the methods of the present disclosure are applicable for any display including more than one display portion. For example, two different touch I/O devices may form two portions of a single display, which may optionally be contained in a single housing or in more than one housing. As another example, the two different touch I/O devices may form two separate displays (e.g., not connected by a hinge or otherwise joined into a common enclosure).

Figure 1B:
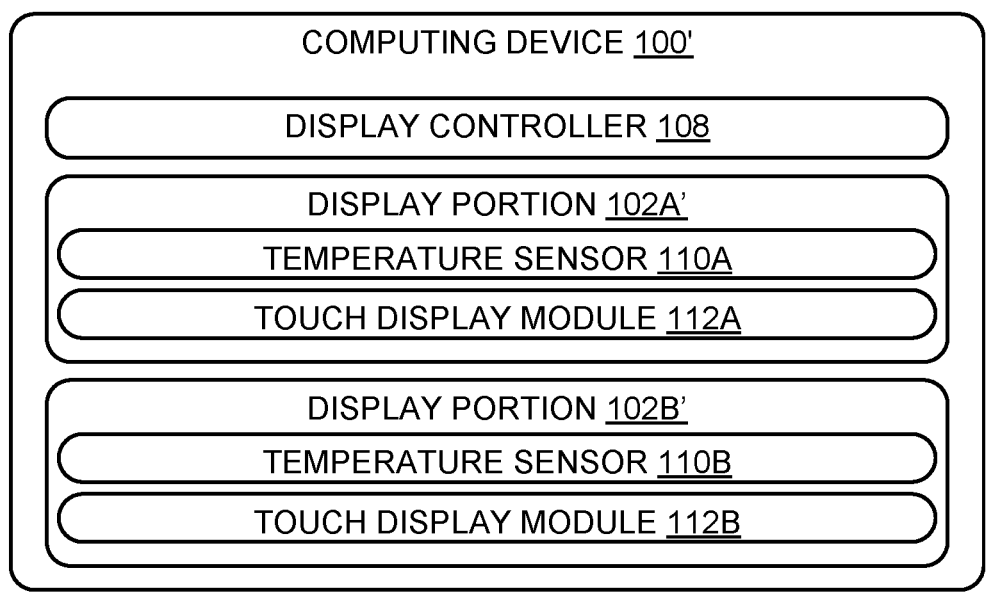
FIG. 1B schematically depicts an exemplary computing device.

FIG. 1B—Schematic Depiction of Computing Device

Accordingly, FIG. 1B shows a schematic depiction of a computing device 100' that includes two display portions 102A' and 102B'. For each touch I/O device, computing device 100' includes a corresponding TDM device (e.g., TDM device 112A corresponding to display portion 102A' and TDM device 112B corresponding to display portion 102B') and a corresponding temperature sensor (e.g., temperature sensor 110A corresponding to display portion 102A', and temperature sensor 110B corresponding to display portion 102B'). Although computing device 100' is depicted with display portions based on TDM devices, the examples shown herein are non-limiting and the techniques of the present disclosure may be applied to any touch I/O devices using any suitable technology. The different display portions may form a single display which may be used for user interaction, for example, computing device 100' includes a display comprising the first display portion 102A' and the second display portion 102B'.

Computing device 100' may take any suitable form factor, for example a mobile computing device, smartphone, tablet, laptop, television, and/or any other device configured for interaction via two or more display portions (e.g., via two or more touch I/O devices). As a non-limiting example, computing device 100 shown in FIG. 1A may be an example of a computing device 100'. For example, for computing device 100, the first display portion is a first display device, namely touch I/O device 102A, in a first device housing 104A, and the second display portion is a second, different display, namely touch I/O device 102B, in a second, different device housing 104B. Furthermore, although computing device 100' is shown with just two display portions 102A' and 102B', the methods of the present disclosure may also be applied for computing devices having three or more display portions.

Computing device 100' further includes a display controller 108. Display controller 108 is configured to assess a temperature condition of a surface of the first display portion. Based on the temperature condition, display controller 108 is configured to migrate display content from the first display portion to the second display portion (e.g., to use the second display portion instead of the first display portion if the first display portion gets too warm). More generally, display controller 108 may be configured to assess temperature condition(s) with regard to the second display portion and, when more than two display portions are present, with regard to any other display portion. Accordingly, content may be dynamically migrated from any display portion to a different display portion, based on temperature conditions assessed for the different display portions. Although the examples presented herein are with regard to migrating display content from a first display portion to a second display portion, more generally the techniques disclosed herein may be applied to migrate display content from any display portion that is too warm, to any other display portion (e.g., to a cooler display portion). For example, if the second display portion becomes too warm, the content may be migrated to the first display portion.

As a non-limiting example, assessing the temperature condition may be based on assessing an estimated temperature of a surface of the first display portion 102A'. For example, the temperature of the surface of the first display device may be estimated based on measuring a temperature of the temperature sensor 110A associated with display portion 102A'. Responsive to the estimated temperature exceeding a predefined threshold, display controller 108 is configured to initiate a switching of display content from one of the display portions to the other display portion (e.g., from the first display portion to the second display portion).

Temperature sensor 110A may be located in any suitable location relative to display portion 102A'. For example, temperature sensor 110A may be configured to estimate a temperature at a display surface of display portion 102A'. Accordingly, the temperature sensor may be disposed near the display surface. Alternately, the temperature sensor may be included in a circuit board associated with the display controller, which may be near but not necessarily at the display surface. Accordingly, the temperature sensor may be calibrated for estimating temperature at the display surface, for example based on empirical calibration conducted by correlating temperature measurements at the temperature sensor to corresponding temperature measurements at the display surface.

Figure 2:
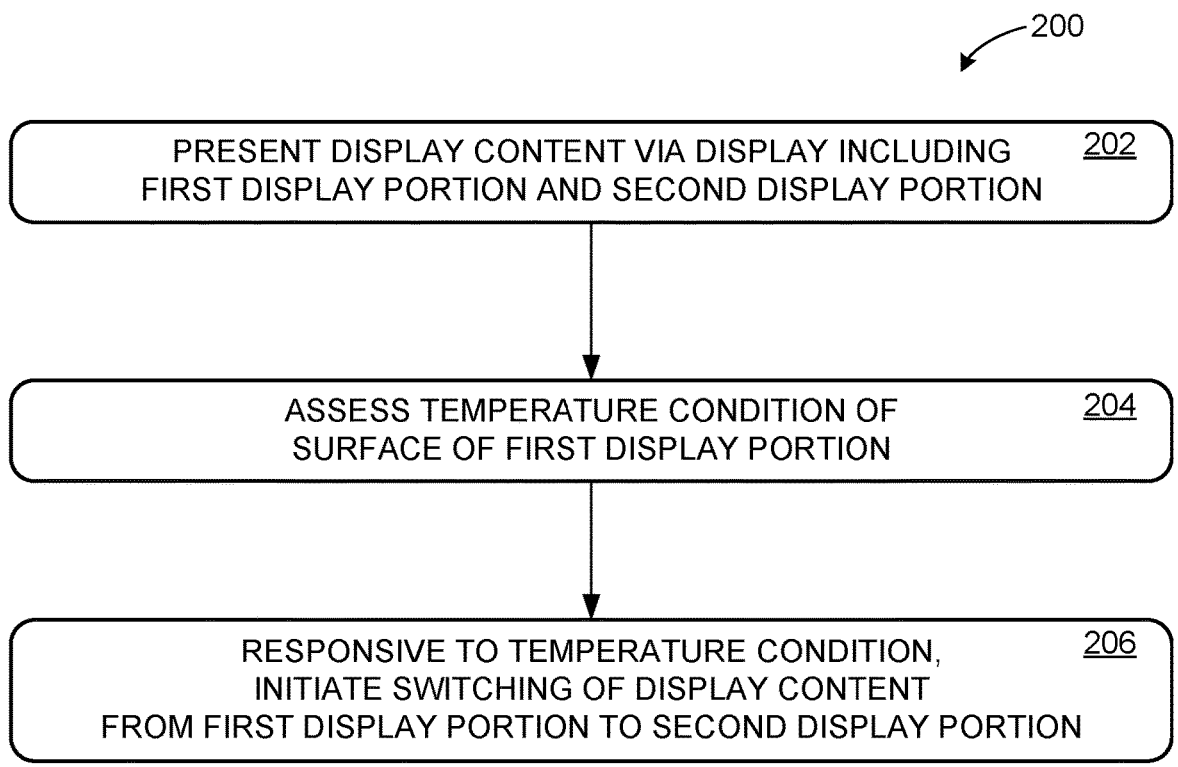
FIG. 2 shows a method for controlling display devices.

FIG. 2—Exemplary Method for Switching Display Content

As described above, the techniques of the present disclosure are not specific to computing device 100 and/or computing device 100'. The dynamic switching of display content based on temperature may be applicable for any computing device including two or more display portions. Accordingly, FIG. 2 shows a method 200 that may be used to dynamically switch display content for any computing device. As a non-limiting example, computing device 100 and/or computing device 100' may be configured to enact method 200.

At 202, method 200 includes presenting display content via a display including a first display portion and a second display portion.

At 204, method 200 includes assessing a temperature condition of a surface of the first display portion. For example, the assessment may be based on a temperature sensor as described above with regard to FIG. 1B.

At 206, method 200 includes, responsive to the temperature condition, initiating a switching of display content from the first display device to the second display device.

In some examples, a display controller may be configured to cause one of the display portions to display a prompt requesting permission, from a user of the device, to initiate the switching of the display content from one of the display portions to the other display portion. Accordingly, the dynamic switching set forth in method 200 may be applied only if the user has replied affirmatively to such prompt, indicating that it is permissible to switch display content. In some examples, the display controller may be configured to prompt the user before each time that content would be switched. In other examples, the display controller may be configured to prompt the user just one time or a limited number of times, for example, to determine a user-specific, computing-device-specific, and/or application-specific setting for whether or not to allow switching of display content from one display portion to another display portion.

In some examples, the prompt may be configured to determine if 1) just one display portion would be sufficient, and 2) dynamically switching which display portion is being used is permissible. As another example, if the user is only using one display portion, the prompt may be configured to determine only if dynamically switching which display portion is being used is permissible.

Temperature conditions for determining whether or not to initiate switching may be determined in any suitable manner, for example based on measurements from temperature sensors and optionally further based on user settings (e.g., based on user response to a prompt). For example, if the user declined to use dynamic switching when prompted, then no dynamic switching is performed. If the user consented to use dynamic switching, then a temperature condition for determining whether or not to initiate switching may include estimating, based on a measurement from a temperature sensor, that a temperature of a surface of the first display portion is exceeding a predefined temperature threshold (e.g., a maximum safe temperature or a user-defined temperature).

Switching the display content from one of the display portions to the other display portion may be implemented in any suitable manner. In some examples, when a display may be overheating, the content that is displayed on it may be moved to the other display. For example, the switching may include reducing power to a hotter display (e.g., powering down or turning off the warmer display), and displaying the display content on one or more cooler display(s). In other words, switching the display content includes switching the physical display in use, on a dual- or multiple-display system, based on the temperature of the physical displays. Switching the physical display in use may be particularly advantageous with regard to system performance, battery life, and user comfort, since the hotter display may be able to rapidly cool while the power is reduced. Switching the physical display in use may be particularly applicable in various situations. As non-limiting examples, switching the physical display in use may be particularly applicable: 1) when only one display is needed; 2) when higher system performance is desired; 3) when longer battery life is desired; and/or 4) when touch temperature of a display has exceeded a predefined threshold such as a safety threshold. In other examples, the switching may include swapping which display is used to show the display content (e.g., while keeping two or more displays powered on).

In some examples, initiating the switching of the display content from one of the display portions to the other display portion includes swapping display content of the first display portion and the second display portion. In other words, as a sending display portion (e.g., the first display portion) gets too hot, content may be migrated from the sending display portion to a receiving display portion, and any content that was displayed at the receiving display portion may be displayed at the sending display portion. For example, if the first display portion is accumulating heat at a higher rate than the second display portion (e.g., due to a higher-resolution or more brightly backlighted visual presentation task), then as the first display portion becomes hotter, both display portions may be kept at an acceptably low temperature for a longer period of time, by swapping content at the two display portions so that the first display portion (which is initially at a higher temperature) accumulates heat at a slower rate than the second display portion (which is initially at a lower temperature and may be operated for longer with heat accumulating at a higher rate before overheating).

As another example, initiating the switching of the display content from one of the display portions to the other display portion may include presenting display content previously associated with the first display portion, via the second display portion. Alternately or additionally, initiating the switching of the display content from one of the display portions to the other display portion may include presenting display content previously associated with the first display portion, via the second display portion; and reducing power to the first display portion. In some examples, reducing power to the first display portion includes switching off the first display portion. In other examples, the first display portion may be operated at a lower power, for example, by showing lower-resolution visual content (e.g., decreasing power requirements of GPU and/or other circuitry), reducing BLU brightness or turning off the BLU, showing a screensaver, and/or showing an indicator (e.g., indicating that the screen is operating at reduced power to allow cooling).

Method 200 is configured for dynamically switching display content from a first display portion to a second display portion. As described above, method 200 is typically configured to switch display content based on the first display portion exceeding a threshold temperature, e.g., so as to use the second, cooler display portion and/or to allow the first display portion to cool. More generally, the temperature condition may be assessed based on desired performance for a visual presentation task. As an example, if the first display portion is sufficiently warm that it would only be able to visually present content using a desired performance level (e.g., with regard to GPU performance, resolution, and/or backlight brightness) for a short period of time before it would become too hot, and if the second display portion is cooler, then the likely overheating of the first display portion may be detected in advance of the estimated temperature actually exceeding the predefined threshold. Accordingly, the display content may be migrated in advance of the first display portion actually becoming too warm, thereby permitting the visual presentation task to be performed with a higher performance and/or for a longer duration.

In some examples, the end time and/or total duration of a visual presentation task may be predictable. For example, a movie playback task may have a predictable end point defined by a length of the movie being played. More generally, duration/end time for computing tasks may be predicted based on task-specific information (e.g., media duration), usage patterns, user configuration (e.g., take a break every 30 minutes), or any other suitable factor. As an example, some tasks may include natural break points that may occur with some predictability, for example, while working with an office program to edit a document, a user may save on average every 5 minutes, or while web browsing, a user may open a new browser tab every 5 minutes. Accordingly, in some examples, method 200 may be configured to avoid switching display content until a boundary between tasks (e.g., switch display content immediately after a user saves a document, switches to a new tab, or completes playing back a video) so as to avoid interrupting user interaction.

After dynamically switching visual content from the first display portion to the second display portion, based on lower power allocation to the first display portion, the first display portion may be able to cool before the second display portion reaches the predefined temperature threshold. Accordingly, the process set forth in method 200 may be iterated, for example, to swap display content back and forth between the first and second display portion to maintain acceptable temperatures for both display portions.

In some examples, total heating may be predicted based on current performance levels for a visual presentation task. As a non-limiting example, heat accumulation may be substantially determined by backlight power, video resolution, and/or other factors that may remain constant or bounded above and/or below, throughout a visual presentation task. Accordingly, the temperature condition may include a predicted temperature after a visual presentation task including displaying content that causes an estimated power consumption for an estimated display time exceeding a predefined temperature threshold. For example, current temperature and/or rate of temperature change may be used to predict an eventual temperature of a display portion in order to intelligently determine whether to immediately switch display content immediately or whether to defer switching display content until later (e.g., until a boundary between tasks). As an example, if an estimated power consumption and/or estimated display time of a visual presentation would result in the predicted temperature being too high before the user is done interacting with the visual presentation, switching the visual presentation to a different display portion may cause an interruption to the user. Accordingly, by switching display content preemptively, the user may be able to engage in the task for a longer time without disruption.

Figure 3:
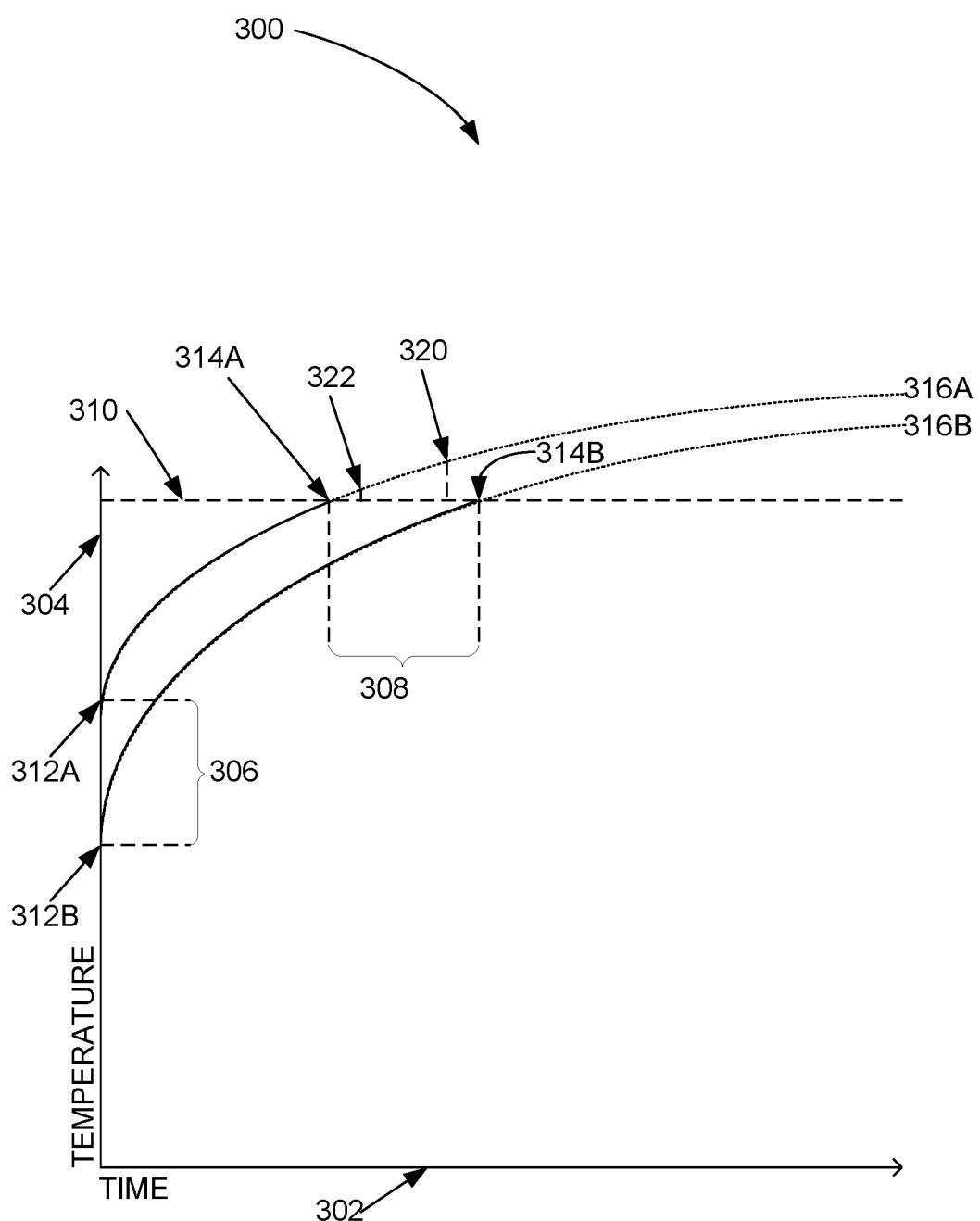
FIG. 3 shows an exemplary temperature curve diagram.

FIG. 3—Exemplary Temperature Curve Diagram

Current temperature and/or rate of temperature changes may be visualized in a temperature curve diagram 300 as shown in FIG. 3. Temperature curve diagram 300 plots two different temperature curves 316A and 316B, relative to an x-axis 302 indicating time, and a y-axis 304 indicating temperature. Accordingly, for example, temperature curve 316A shows temperature rising along the depicted curve as time passes. Temperature curve diagram 300 is shown without units and without any particular scale, and illustrates general relationships that may be applied to predict temperature of display portions in a general manner. As such, temperature curve diagram 300 is a non-limiting illustration of typical temperature relationships that may occur for different display technologies, with different temperature thresholds, etc. The time/temperature relationships shown in FIG. 3 are believed to hold for various display technologies, but any other temperature curve model may be similarly used to predict temperature conditions for dynamically switching displays. The temperature curves are shown relative to a predefined temperature threshold 310.

Exemplary temperature curve 316A shows hypothetical temperatures that are predicted to result from carrying out a hypothetical visual presentation task on a first display portion that starts at an initial temperature 312A. Starting at the initial temperature 312A, the temperature curve 316A indicates a temperature that rises at a non-constant rate (e.g., the temperature rises faster when the temperature is low, and the rate of temperature increase decreases as the temperature is higher). As the curve 316A indicates, the temperature of the first display portion is predicted to rise to eventually exceed the predefined threshold temperature 310 at a time 314A.

Exemplary temperature curve 316B is similar to curve 316A, but showing hypothetical temperatures that are predicted to result from carrying out the same hypothetical visual presentation task on a second display portion that, while otherwise identical to the first display portion, starts at a lower initial temperature 312B (e.g., so that there is a difference 306 between the initial temperatures). As depicted, the second display portion starts at a lower temperature and accordingly, a longer time may pass before the second display portion exceeds the predefined threshold temperature at time 314B. Accordingly, there is a time difference 308 between how long the visual presentation task can be carried out on the two different displays before overheating would occur. In particular, the curves 316A and 316B indicate that the visual presentation task could be carried out for longer on the second display portion before overheating would occur.

Accordingly, temperature curves and/or any similar mathematical prediction may be applied to assess a temperature condition, for example, the temperature condition may include a predicted temperature curve 316A intersecting the temperature threshold 310 at a current time or at a future time within a threshold amount of time (e.g., if the temperature curve would intersect within one minute). For example, a display controller may be configured to preemptively switch content from the first display portion to the second display portion, for example, to avoid switching later in a way that would interrupt a task. For example, if a task is initiated on the first display portion and predicted to end at time 320, then running it on the first display would likely result in substantial overheating for a substantial time (e.g., the time between time 314A and time 320). Accordingly, a display controller according to the present disclosure may be configured to pre-emptively switch the display task to use the second display portion instead of the first display portion, which would not overheat until later time 314B which is after the predicted end of the task at time 320. Accordingly, the task may be finished without causing either display portion to overheat. As an additional benefit, the switching is done pre-emptively to minimize interruptions during the task.

In some examples, the display controller is configured to defer switching of the display content from one display portion to the other display portion, if the predicted temperature would exceed the predefined temperature threshold for at most a predefined acceptable amount of time before completing a current display content task. For example, a task may be predicted to end only a short time after a temperature threshold is exceeded, and/or while the temperature remains not much higher than the threshold. For example, a visual presentation task may be predicted to end at time 322. Although the display controller may detect possible overheating of the first display portion, the first display portion would only be slightly above the predefined threshold temperature and for only a short time before the task is completed. Accordingly, to avoid interrupting the user interaction, the display controller may be configured to defer switching of the display content until after time 322 when the task is finished. The acceptable amount of time for which the predicted temperature is permitted to exceed the predefined temperature threshold may be defined in any suitable manner, for example based on a standard value (e.g., 5 minutes) or based on a user-specific configuration setting.

Figure 4:
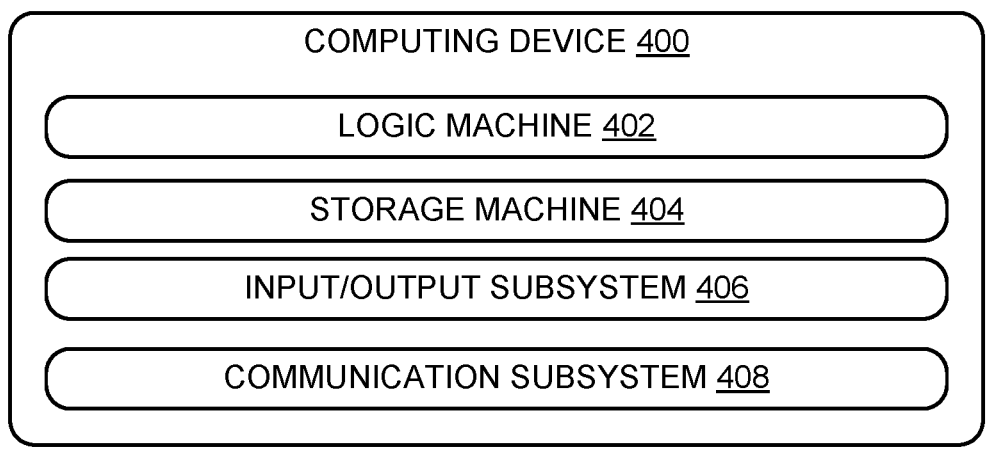
FIG. 4 shows an exemplary computing system.

FIG. 4—Exemplary Computing System

In some embodiments, the methods and processes described herein may be tied to a computing system of one or more computing devices. In particular, such methods and processes may be implemented as a computer-application program or service, an application-programming interface (API), a library, and/or other computer-program product.

FIG. 4 schematically shows a non-limiting embodiment of a computing system 400 that can enact one or more of the methods and processes described above. Computing system 400 is shown in simplified form. Computing system 400 may take the form of one or more personal computers, server computers, tablet computers, home-entertainment computers, network computing devices, gaming devices, mobile computing devices, mobile communication devices (e.g., smart phone), and/or other computing devices. As an example, computing device 100 of FIG. 1A and/or computing device 100' of FIG. 1B may be examples of a computing system 400. Computing system 400 may be configured to implement the methods of the present disclosure, for example, to enact method 200 of FIG. 2.

Computing system 400 includes a logic machine 402 and a storage machine 404. Computing system 400 may optionally include an input/output subsystem 406, communication subsystem 408, and/or other components not shown in FIG. 4.

Logic machine 402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 404 includes one or more physical devices configured to hold instructions executable by the logic machine to implement the methods and processes described herein. When such methods and processes are implemented, the state of storage machine 404 may be transformed—e.g., to hold different data.

Storage machine 404 may include removable and/or built-in devices. Storage machine 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 404 may include volatile, nonvolatile, dynamic, static, read/write, read-only, random-access, sequential-access, location-addressable, file-addressable, and/or content-addressable devices.

It will be appreciated that storage machine 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 402 and storage machine 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 implemented to perform a particular function. In some cases, a module, program, or engine may be instantiated via logic machine 402 executing instructions held by storage machine 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, input/output subsystem 406 may include one or more display devices, which may be used to present a visual representation of data held by storage machine 404. For example, input/output subsystem may include two or more display portions such as display portion 102A and display portion 102B. This visual representation may take the form of a graphical user interface (GUI). As the herein described methods and processes change the data held by the storage machine, and thus transform the state of the storage machine, the state of display devices of input/output subsystem 406 may likewise be transformed to visually represent changes in the underlying data. Input/output subsystem 406 may include one or more display devices utilizing virtually any type of technology. Such display devices may be combined with logic machine 402 and/or storage machine 404 in a shared enclosure, or such display devices may be peripheral display devices.

When included, input/output subsystem 406 may comprise or interface with one or more user-input devices such as a keyboard, mouse, touch screen, or game controller. In some embodiments, the input/output subsystem 406 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. In some examples, input/output subsystem 406 may include user-input devices in the form of one or more touch-display modules, configured to receive touch input corresponding to displayed visual content. For example, input/output subsystem 406 may include two or more touch-display modules such as touch display module 112A of display portion 102A and touch display module 112B of display portion 112B.

When included, communication subsystem 408 may be configured to communicatively couple computing system 400 with one or more other computing devices. Communication subsystem 408 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the Internet.

In an example, a display device comprises a display comprising a first display portion and a second display portion. In this or any other example, the display device further comprises a display controller. In this or any other example, the display controller is configured to assess a temperature condition of a surface of the first display portion In this or any other example, the display controller is configured, responsive to the temperature condition, to initiate a switching of display content from one of the display portions to the other display portion. In this or any other example, the temperature condition includes an estimated temperature of the surface of the first display portion exceeding a predefined threshold. In this or any other example, the predefined threshold is an empirically-determined safety threshold. In this or any other example, the predefined threshold is a user-defined temperature threshold. In this or any other example, the display device further comprises a first temperature sensor associated with the first display portion, wherein assessing the temperature condition is based at least on a temperature measurement by the first temperature sensor. In this or any other example, the first display portion is a first display device in a first device housing, and the second display portion is a second, different display device in a second, different device housing. In this or any other example, initiating the switching of the display content from one of the display portions to the other display portion includes swapping display content of the first display portion and the second display portion. In this or any other example, initiating the switching of the display content from one of the display portions to the other display portion includes presenting, on the second display portion, display content previously associated with the first display portion. In this or any other example, initiating the switching of the display content from one of the display portions to the other display portion includes reducing power to the first display portion. In this or any other example, reducing power to the first display portion includes switching off the first display portion. In this or any other example, the display controller is configured to cause one of the first display portion and the second display portion to display a prompt requesting permission, from a user of the device, to initiate the switching of the display content from one of the display portions to the other display portions. In this or any other example, the temperature condition includes a predicted temperature after displaying content having a estimated power consumption for an estimated display time exceeding a predefined temperature threshold. In this or any other example, the display controller is configured to defer switching of the display content from one display portion to the other display portion, if the predicted temperature would exceed the predefined temperature threshold for at most a predefined acceptable amount of time before completing a current display content task.

In an example, a method of dynamically switching display content based on display temperature comprises presenting display content via a display including a first display portion and a second display portion. In this or any other example, the method further comprises assessing a temperature condition of a surface of the first display portion. In this or any other example, the method further comprises, responsive to the temperature condition, initiating a switching of display content from the first display portion to the second display portion. In this or any other example, the temperature condition includes an estimated temperature of the surface of the first display portion exceeding a predefined threshold. In this or any other example, initiating the switching of the display content from one of the display portions to the other display portion includes swapping display content of the first display portion and the second display portion. In this or any other example, initiating the switching of the display content from one of the display portions to the other display portion includes (1) presenting, on the second display portion, display content previously associated with the first display portion; and (2) reducing power to the first display portion. In this or any other example, the temperature condition includes a predicted temperature after displaying content having an estimated power consumption for an estimated display time exceeding a predefined temperature threshold. In this or any other example, the method further comprises deferring switching of the display content from one display portion to the other display portion, if the predicted temperature would exceed the predefined temperature threshold for at most a predefined acceptable amount of time before completing a current display content task.

In an example, a display device comprises a display comprising a first display device in a first display housing and a second display device in a second display housing. In this or any other example, the display device further comprises a display controller configured to assess an estimated temperature of a surface of the first display device, including measuring a temperature of a temperature sensor associated with the first display device. In this or any other example, the display controller is further configured, responsive to the estimated temperature exceeding a predefined threshold, to initiate a switching of display content from the first display device to the second display device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A device, comprising:
a display comprising a first display portion and a second display portion; and
a display controller configured to:
assess a temperature condition of the first display portion; and
responsive to the temperature condition, initiate a switching of display content from one of the display portions to the other display portion,
wherein the temperature condition includes a predicted temperature after displaying content having an estimated power consumption for an estimated display time, the predicted temperature exceeding a predefined temperature threshold; and
wherein the display controller is configured to defer switching of the display content from the one display portion to the other display portion, responsive to the predicted temperature being predicted to exceed the predefined temperature threshold for at most a predefined acceptable amount of time before completing a current display content task.

2. The device of claim 1, wherein the predicted temperature includes an estimated temperature of a surface of the first display portion.

3. The device of claim 1, wherein the predefined temperature threshold is an empirically-determined threshold.

4. The device of claim 1, wherein the predefined temperature threshold is a user-defined temperature threshold.

5. The device of claim 1, further comprising a first temperature sensor associated with the first display portion, wherein assessing the temperature condition is based at least on a temperature measurement by the first temperature sensor.

6. The device of claim 1, wherein the first display portion is a first display device in a first device housing, and the second display portion is a second, different display device in a second, different device housing.

7. The device of claim 1, wherein initiating the switching of the display content from the one of the display portions to the other display portion includes swapping display content of the first display portion and the second display portion.

8. The device of claim 1, wherein initiating the switching of the display content from the one of the display portions to the other display portion includes presenting, on the second display portion, display content previously associated with the first display portion.

9. The device of claim 1, wherein initiating the switching of the display content from the one of the display portions to the other display portion includes reducing power to the first display portion.

10. The device of claim 9, wherein reducing power to the first display portion includes switching off the first display portion.

11. The device of claim 1, wherein the display controller is configured to cause one of the first display portion and the second display portion to display a prompt requesting permission, from a user of the device, to initiate the switching of the display content from the one of the display portions to the other display portions.

12. The device of claim 5, wherein the first temperature sensor forms part of the display controller.

13. A method of dynamically switching display content based on display temperature, comprising:
presenting display content via a display including a first display portion and a second display portion;
assessing a temperature condition of the first display portion; and
responsive to the temperature condition, initiating a switching of display content from the first display portion to the second display portion,
wherein the temperature condition includes a predicted temperature after displaying content having an estimated power consumption for an estimated display time, the predicted temperature exceeding a predefined temperature threshold, and
wherein the method further comprises deferring switching of the display content from the first display portion to the second display portion, responsive to the predicted temperature being predicted to exceed the predefined temperature threshold for at most a predefined acceptable amount of time before completing a current display content task.

14. The method of claim 13, wherein the predicted temperature includes an estimated temperature of a surface of the first display portion exceeding the predefined temperature threshold.

15. The method of claim 12, wherein initiating the switching of the display content from the first display portion to the second display portion includes swapping display content of the first display portion and the second display portion.

16. The method of claim 13, wherein initiating the switching of the display content from the first display portion to the second display portion includes (1) presenting, on the second display portion, display content previously associated with the first display portion; and (2) reducing power to the first display portion.

17. The method of claim 13, wherein the display includes a computing system comprising a logic machine and a storage machine having instructions stored thereon executable by the logic machine to perform the method.

18. A device, comprising:
a display comprising a first display device in a first display housing and a second display device in a second display housing; and
a display controller configured to:
assess an estimated temperature of a surface of the first display device, including measuring a temperature via a temperature sensor associated with the first display device; and
responsive to the estimated temperature exceeding a predefined temperature threshold for at least a threshold amount of time, initiate a switching of display content from the first display device to the second display device.

19. The device of claim 18, further comprising:
initiating a switching of display content from the second display device to the first display device responsive to the estimated temperature of the surface of the first display device exceeding the predefined temperature threshold for at least the threshold amount of time.

20. The device of claim 18, wherein the predefined temperature threshold is a user-defined temperature threshold.

* * * * *